Figure 1:
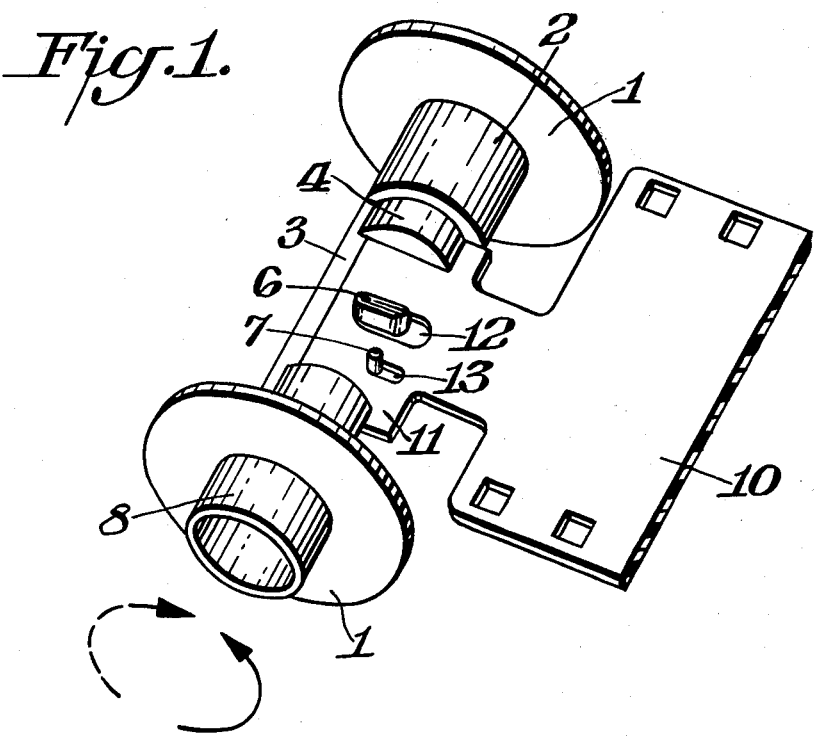

United States Patent [19]

Kluczynski et al.

[11] 4,398,679

[45] Aug. 16, 1983

[54] EXTERNALLY HOOKED STORAGE SPOOL FOR ROTARY WINDING ON AN UNWINDING

[75] Inventors: Achim Kluczynski, Overath; Erik Altmann, Muelheim an der Ruhr, both of Fed. Rep. of Germany

[73] Assignee: Agfa-Gevaert Aktiengesellschaft, Leverkusen, Fed. Rep. of Germany

[21] Appl. No.: 286,263

[22] Filed: Jul. 23, 1981

[30] Foreign Application Priority Data

Jul. 31, 1980 [DE] Fed. Rep. of Germany ....... 3029022

[51] Int. Cl.³ ............................................ B65H 75/28
[52] U.S. Cl. ....................................... 242/74; 242/74.1
[58] Field of Search .................. 242/74, 74.1, 74.2, 242/125, 125.1

[56] References Cited

U.S. PATENT DOCUMENTS

| 2,137,502 | 11/1938 | Nerwin | 242/74 |
| 2,182,398 | 12/1939 | Gantvier | 242/74 |
| 2,477,010 | 7/1979 | Schmidt | 242/74 X |
| 3,361,380 | 1/1968 | Mizutani | 242/74 |

FOREIGN PATENT DOCUMENTS 501543 7/1930 Fed. Rep. of Germany ........ 242/74

Primary Examiner—Edward J. McCarthy
Attorney, Agent, or Firm—Connolly and Hutz

[57] ABSTRACT

The invention relates to an externally hooked storage spool for rotary winding on and unwinding elastic materials comprising a cylindrical core and two flanges, the core having wing-like catching members for catching the end of the elastic material while the spool rotates and one holding hook and one pin to prevent unhooking in an opening between the wing like catching members and the end of the strip is provided with a hammer-shaped first cut in which are produced at least one holding hole and one hole to prevent unhooking.

7 Claims, 4 Drawing Figures

EXTERNALLY HOOKED STORAGE SPOOL FOR ROTARY WINDING ON AN UNWINDING

The present invention relates to an externally hooked storage spool for rotary winding on and unwinding having a cylindrical core which contains at least one core opening and in which catches and safety devices to prevent unhooking of a band which is to be attached to the spool are moulded and which is preferably provided with two flanges which externally hooked storage spool is intended for winding on and unwinding band-shaped, elastic materials, in particular film strips and the bandshaped materials are themselves provided with appropriately shaped holes for hooking into the hooks of the externally hooked spool.

A large number of types of spool are known which are used for winding different band materials. With these spools, this problem of attaching, for example, a strip of film, to the spool for winding is solved in a variety of ways, for example, by looping round, bonding, riveting, clamping or hooking on or in a slit in the core of the spool. The present invention is concerned with hooked spools in which the band provided with holes is hooked.

For miniature films spools which are described, as double-hooked spools for example, are known. These spools have an opening in the core of the spool, in which are located moulding catching hooks and separate guiding surfaces or holding members. The end of the film which is provided with a hole is inserted into this opening, in the core so that the guiding surfaces on both sides of the hooks curve the film around the hooks until the hole in the film snaps into the hook. After the hole has snapped into the hook, the guiding surfaces due to the film rigidity prevent the film strip from spontaneously unhooking from the spool.

This known type of spool has the disadvantage that during the automatic hooking-in process, the spool has to be in a specific position and must remain in this position until the hooking-in process is completed. This is naturally time-consuming and thus reduces the economy of the process. Furthermore, it is also a disadvantage of these spools that only relatively small tensile forces can be applied when film strip materials are transferred, which consequently means that in many cases, the film pulls out of the spool and thus cannot be used.

U.S. Pat. No. 3,361,380 describes a combination of a spool and a film strip, in which two hooks are positioned in a slit in the spool and two holes are positioned in the film strip to improve the holding force. This spool also is suitable to only a certain extent for reliable securing of the film to the spool and does not permit rotary winding-on.

German Offenlegungsschrift No. 2,444,106 describes a spool which has an external hook which should hook the film in during rotation and should prevent unhooking because there are guiding surfaces on both sides of the hook.

The spool shows unreliable hooking-in and thus leads to a considerable amount of wastage when used in the production of film cartridges with such spools. The guiding surfaces provided as a safety device against unhooking do not satisfactorily prevent the film from unhooking from the spool. The tensile forces which can be applied are similar to those of normal hooked spools and are unsatisfactory.

An externally hooked spool for winding band materials is known from German Offenlegungsschrift No. 2,745,981, in which one or more catching hooks with counter hooks and pairs of holding members are moulded in an opening in the core of the spool for hooking in a band provided with punched-in holes, when the spool rotates. When the hooking-in process is finished, the band material is prevented from unhooking when the winding direction is changed. This spool makes it possible for a film strip, for example, to be threaded into a closed film cassette through the film mouth, the end of the film hooking into the rotating spool.

This externally hooked spool has the disadvantage that the catching hook grasps the film strip and accelerates irregularly. The force exerted by the rotating spool on the holes punched into the end of the film strip is very considerable, so that the holes may easily tear, particularly when the hooking-in process is carried out in a cassette and the film strip is braked by the cassette mouth.

Reliable hooking-in is not certain and the film strip may unhook when the spool rotates. Due to its complicated shape, the spool requires an injection moulding die with several dividing planes and is therefore expensive to produce.

The object of the invention is to provide an externally hooked storage spool of the type mentioned above, using which it is possible, in simple and cheap manner, to catch a continuously supplied, band-shaped elastic strip of material and reliably to hook it into a rotating spool, so that after the hooking-in process a good holding force and reliable prevention of unhooking are obtained between the spool and strip of material, independent of the direction of rotation of the spool.

The invention is based on an externally hooked spool of the type mentioned by way of introduction, in which both a wing-like catching member for catching the end of the bandshaped strip of material while the spool rotates is moulded on each side of the opening in the core of the spool in the direction of the axis of the spool and at least one holding hook and one pin to prevent unhooking are positioned in the opening in the core between the catching members, and the end of the bandshaped strip of material is provided with a hammer-shaped first cut, in which are punched at least one holding hole and one hole which prevents unhooking.

Surprisingly, the arrangement of both a wing-like catching member for catching the end of the strip, which, for this purpose, is provided with a hammer-shaped first cut, and the locking of the holding hole and the hole which prevents unhooking, which then takes place in the holding hook and the pin to prevent unhooking and is forced by the wing-like catching members makes possible a reliable catching action of the end of the strip and also a reliable hooking-in action. As the hammer-shaped end of the strip is prevented from buckling through the slits between the wing-like catching members and the plane of the spool core after locking into the holding hook, unhooking is impossible, independent of the direction in which the spool is rotated. Because the holding hook and the pin to prevent unhooking are arranged between the catching members, the end of the strip is simultaneously held in two holes, so that the danger of the strip tearing where there are considerably tensile strains is considerably reduced. It has also been shown to be advantageous that, when the end of the strip has been caught, the externally hooked and storage spool rotates further and the hooking-in action only takes place later, as a result of which the instantaneous tensile strain during the hooking-in action is reduced since it takes place over an edge of the core opening, which absorbs a part of the tensile strength.

The end of the strip may be caught just as reliably and rapidly when the strip end is introduced through the mouth of a cassette, in which the externally hooked storage spool rotates.

In a preferred embodiment, two holding hooks are positioned between the catching members instead of one holding hook and the pin to prevent unhooking and accordingly, the end of the strip is provided with a hammer-shaped first cut in which are punched two holding holes for the holding hooks.

Where two holding hooks are provided, the holding holes in the hammer-shaped first cut are equal in size and the holding force of the spool is improved.

In an advantageous embodiment, two opposite core openings are provided in the spool core with catching members, holding hooks and/or pins to prevent unhooking, so that the holding hooks point towards different sides of the spool and are positioned rotated about 180° on both sides of the core and the pins to prevent unhooking and the holding hooks are positioned so that they are exactly opposite each other.

A first result of this embodiment is that the catching and hooking-in procedures are accelerated, because a catching and hooking-in procedure takes place when the spool rotates through 180° and also, less material is required for the reel.

The holding hooks, on the side opposite to the point of the hook are provided with a surface extending towards the axis of the spool. The film strip, when pushed against the hook, therefore does not buckle and cannot jump out of the hook.

A reliable hooking-in action is also achieved because the holding hooks and the pins to prevent unhooking project outwards from the reel axis beyond the top edge of the slit between the catching member and the opening in the spool, and the holding hook and the pin to prevent unhooking are slanted towards the flanges.

When the end of the band is caught, the band initially arches over the holding hooks or over the holding hooks and pins to prevent unhooking until the holes in the end of the band are located above these. Because of the elasticity of the band material, which tends to lie flat, the holes in the end of the band then jump into the hooks or into the hook and the pin. The slope of the hooks and pins corresponds approximately to the radius in which the band is arched between the slits which the catching members form with the plane of the core opening, shortly before the hooking-in action.

It has also been found that it is preferred, in order to avoid prints or pressings through on the band, that catching members, holding hooks and pins to prevent unhooking lie inside the reel core circumference and during winding, the band is only carried by the cylindrical parts of the reel core near to the flanges.

An embodiment is illustrated in the drawings and will be described in detail in the following.

Figure 2:
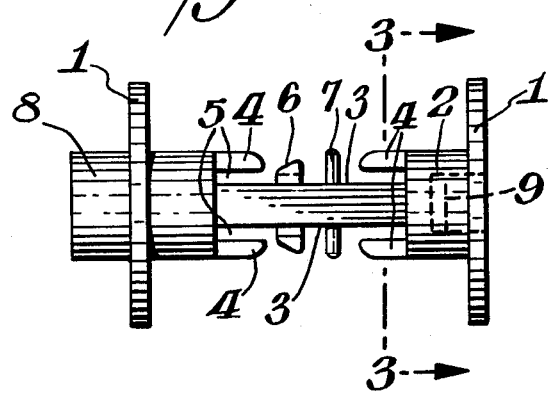
Figure 3:
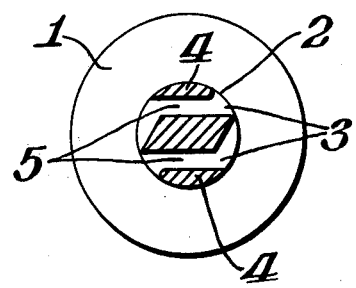
Figure 4:
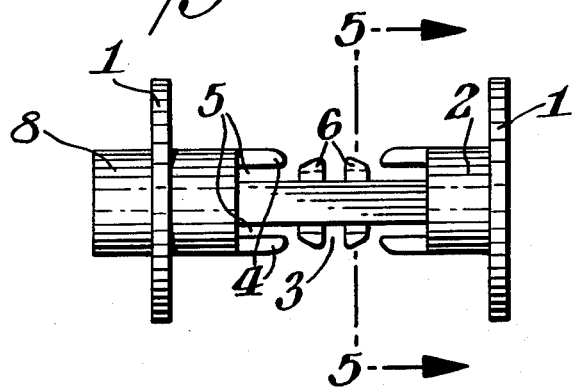
Figure 5:
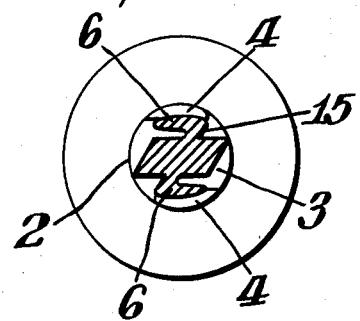

FIG. 1 illustrates a perspective view of an externally hooked storage spool with a suitable band end, FIG. 2 illustrates a side view of an externally hooked storage spool with a catching and holding device on both sides, FIG. 3 illustrates a radial section along the line 3—3 through the spool of FIG. 2, FIG. 4 illustrates a side view of an externally hooked storage spool with two holding hooks in each of two core openings, and FIG. 5 illustrates a radial section through the holding hooks of the spool taken along the line 5—5 of FIG. 4.

In FIG. 1, a miniature spool for miniature films is shown as an example of a use for the externally hooked storage spool. The spool comprises a core 2 on which flanges 1 are located on both sides. On one side of the spool a hollow cylindrical peg 8 is located and on the other side, a bore 9 is introduced (FIG. 2). The core 2 has at least one opening 3 on both sides of which are located wing-like catching members 4 which, with their lower side, form catching member slits 5 (FIG. 2) with the remaining core 2. A holding hook 6 is positioned on the remaining core 2 between the catching members 4.

In FIG. 1, the holding hook 6 is in the form of a single holding hook, but it may also be in the form of a double holding hook (as shown in FIGS. 2 and 5). A pin 7 to prevent unhooking may be provided as an additional safety device, as a result of which the risk of unhooking is further reduced. This pin 7 is, however not strictly necessary because with only one holding hook, adequate safety may be achieved.

One end of a film strip 10 is hooked into the spool of FIG. 1. The end of the film strip 10 has a hammer-shaped first cut 11 in which are punched a holding hole 12 and a hole 13 to prevent unhooking. The taper 14 of the film strip 10 is narrower than the spacing build up by the catching members 4 and longer than the width of the catching members 4. In order to be able effectively to insert the taper 14 of the film strip 10 into the opening 3, the inwardly-pointing edges of the catching members 4 are slanted (see FIG. 2).

The catching and hooking-in procedures take place in the following manner: the spool rotates in the direction of the arrow while the film strip 10 is supplied tangentially to the core 2. During this motion, the hammer-shaped first cut initially slides over the catching members 4.

As the film strip 10 is fed in further, the taper 14 slides between the wing-like catching members 4 and these catch the rear edge of the hammer-shaped first cut 11 and draw this into the slit 5 between the catching members 4 and the core opening 3. As the spool rotates further, the holding hook 6 and the pin 7 to prevent unhooking initially pass below the taper 14 and the elastic film arches outwards over the holding hook 6 and the pin 7. As the spool rotates further, the holding hole 12 and the hole 13 in the hammer-shaped first cut 11 pass over the holding hook 6 and the pin 7. As the holes are larger than the holding hook and the pin and the elastic film material tends to occupy a flat position, the hooking-in stage is completed at high speed. During this stage, the spool has rotated further by more than 90°, so that the taper 14 of the film strip 10 is already resting on the edge of the core opening 3 which is on the side of the film strip. The force required to accelerate the film strip after the hooking-in procedure is thus not only transferred from the holding hook 6 and the pin 7 to the film strip 10, but also by the friction of the film strip on the edge of the core opening.

After the hooking-in procedure, the hammer-shaped first cut 11 of the film strip 10 lies flat in the catching member slits 5 on both sides. The holding member 6 and the pin 7 project over the lower edges of the catching member slit 5, so that the film strip can no longer be unhooked even when the spool is rotated in clock-wise direction (the dashed arrow), opposite the normal direction of rotation. The film can only be separated from the spool by tearing the film off from the spool.

FIG. 2 illustrates a side view of the externally hooked storage spool with two core openings 3. The core openings 3 are opposite to each other. The spool of this design has the advantage that only one spool rotation through 180° is required to take place in order to carry out the hooking-in procedure. Where the spools are injection moulded from plastics materials, there is a further advantage of saving in material and the advantage that the spool may be produced using a very simple injection moulding die which requires only one separating cut to remove the spool from the mould.

The holding hooks 6 are positioned in their hooking direction rotated through 180°, but the pins 7 are positioned symmetrically, opposite to each other.

The holding hooks 6 and the pins 7 may slope towards the spool flange 1, corresponding to the arching of the film before the jumping-in action of the holding hole 12 and the hole 13, and to facilitate the sliding-over motion of the film.

FIG. 3 illustrates a section 3—3 through the spool of FIG. 2 along the line 5—5, from which the position of the catching members 4, the catching member slits 5 and the shape of the core 2 may be seen in the region of the core opening.

FIG. 4 illustrates an externally hooked storage spool, which has two holding hooks 6 in each core opening 3 instead of holding hook 6 and one pin 7. This arrangement is particularly suitable when high holding forces between the spool and film strip are required. The tensile force is distributed onto two holding holes 12 which are equal in size by the two holding hooks, and thus the risk of tearing of the holding holes 12 is reduced.

FIG. 5 illustrates a section through the spool in a radial direction in the region of the opposite holding hooks 6 along the line 5—5 of FIG. 4. The holding hooks 6 are shown in a position rotated about 180°. The hooks are provided with a surface 14 extending obliquely inwards towards the spool axis on the side opposite to the point of the hook.

In a film strip 10 which is hooked in is pushed against the reverse side of the hook or if the spool is rotated in clock-wise direction against the film strip 10, then the strip cannot buckle and slide over the holding hook 6. The surface 14 thus prevents unhooking.

The invention is not restricted to the embodiment described, of a film spool for a miniature film and the corresponding film. The externally hooked storage device may be introduced into any core and may be used for winding on or securing any band-shaped elastic material, for example, cine film, narrow films, tapes and other bands. If a band strip is required to be secured to a spool so that it may later be detached, the spool may be provided with a simple device which lowers the holding hooks 6 and the pins 7 inside the core 2 against a spring, until the connection is released (not shown). It is then unnecessary to destroy a section of the band by tearing it off.

We claim:

1. In combination with a storage spool,
   a band shaped material for winding on the spool,
   a cylindrical core of the spool which contains at least one core opening,
   means externally positioned on the storage spool engageable with openings defined in the band-shaped material for hooking into the external engageable means, and wing-like catching members on the spool for catching the end of the band-shaped material while the spool rotates, the wing-like catching members being positioned axially on each side of the opening in the core,
   said external engageable means being at least one hook and one means to prevent unhooking and being positioned in the opening in the core between said catching members,
   a hammer-shaped cut at the end of the band,
   and at least one hole defined in the hammer-shaped cut end for securing the band-shaped material to the spool and at least one hole defined in the cut end to prevent unhooking,
   whereby catches and safety devices are provided to prevent unhooking of the band.

2. The combination as claimed in claim 1 in which said means to prevent unhooking is a pin positioned in the core opening and the cut end is provided with two holes.

3. The combination as claimed in claim 1 in which said means to prevent unhooking is a second holding hook positioned in the core opening and the cut end is provided with two holding holes.

4. The combination as claimed in claims 1, 2 or 3 wherein the cylindrical core contains two core openings positioned diametric of the spool to each other and each opening having associated with it said catching members and said means engageable with holes in the band-shaped material, so constructed and arranged that said engageable means point towards different sides of the spool and are positioned rotated through 180° on both sides of the core and are positioned so that they are exactly opposite to each other.

5. An externally hooked storage spool in the combination as claimed in claims 1, 2 or 3 characterized in that, on the side opposite to the point of the hook each holding hook is provided with a surface extending towards the axis of the spool.

6. An externally hooked storage spool, in the combination as claimed in claims 3 or 4 characterized in that the holding hooks and the pins to prevent unhooking project outwards from the spool axis beyond than the top edge of a slit between the catching member and opening in the core of the spool and that the holding hook and the pins are slanted towards the flanges.

7. The combination as claimed in claim 1 wherein the spool has two flanges and the catching members and the hook and the means to prevent unhooking are positioned within an outer circumference described by the core and the cylindrical core surfaces extending in the vicinity of the flanges being adapted to carry the band-shaped material during winding.

* * * * *